United States Patent
Kozloski et al.

(10) Patent No.: US 9,953,028 B2
(45) Date of Patent: Apr. 24, 2018

(54) COGNITIVE CONTEXTUALIZATION OF EMERGENCY MANAGEMENT SYSTEM COMMUNICATIONS

(71) Applicant: International Business Machines Corporation, Armonk, NY (US)

(72) Inventors: James R. Kozloski, New Fairfield, CT (US); Clifford A. Pickover, Yorktown Heights, NY (US); Melanie E. Roberts, North Melbourne (AU); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/593,038

(22) Filed: Jan. 9, 2015

(65) Prior Publication Data

US 2016/0203123 A1 Jul. 14, 2016

(51) Int. Cl.
*G06F 17/27* (2006.01)
*G06F 17/30* (2006.01)
*G06Q 50/26* (2012.01)

(52) U.S. Cl.
CPC .... *G06F 17/2785* (2013.01); *G06F 17/30654* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 7,430,505 B1 | 9/2008 | Horvitz et al. | |
| 7,912,720 B1* | 3/2011 | Hakkani-Tur | G06F 17/274 704/1 |
| 8,214,214 B2 | 7/2012 | Bennett | |
| 2009/0055190 A1 | 2/2009 | Filev et al. | |
| 2009/0287678 A1 | 11/2009 | Brown et al. | |
| 2010/0036660 A1* | 2/2010 | Bennett | G10L 15/30 704/231 |
| 2010/0131265 A1 | 5/2010 | Liu et al. | |
| 2011/0283190 A1* | 11/2011 | Poltorak | G10L 13/033 715/716 |
| 2012/0308971 A1* | 12/2012 | Shin | G08B 31/00 434/236 |
| 2013/0007055 A1 | 1/2013 | Brown et al. | |

(Continued)

OTHER PUBLICATIONS

IBM, "ACT: Australian Crisis Tracker", Feb. 11, 2014, <http://researcher.watson.ibm.com/researcher/view_group.php?id=5064>.

(Continued)

*Primary Examiner* — Richa Mishra
(74) *Attorney, Agent, or Firm* — William H. Hartwell

(57) ABSTRACT

Software that contextualizes communications during an event by performing the following steps: (i) receiving an input communication from a first user, where the input communication includes input information relating to the event; (ii) receiving first user contextual information, where the first user contextual information pertains to an emotional state of the first user at the time the input communication was received; (iii) determining an output communication based, at least in part, on the received first user contextual information, where the output communication includes output information relating to the event; and (iv) sending the output communication to a first recipient.

13 Claims, 6 Drawing Sheets

(56) References Cited

U.S. PATENT DOCUMENTS

| | | |
|---|---|---|
| 2013/0054512 A1 | 2/2013 | Ephrat et al. |
| 2013/0262501 A1 | 10/2013 | Kuchmann-Beauger et al. |
| 2014/0074826 A1 | 3/2014 | Cooper et al. |
| 2014/0074921 A1* | 3/2014 | Poornachandran G06F 17/30867 709/204 |
| 2014/0108307 A1 | 4/2014 | Raghunathan et al. |
| 2016/0142894 A1* | 5/2016 | Papakonstantinou . H04W 4/023 455/404.1 |

OTHER PUBLICATIONS

IBM, "Disaster Management", Oct. 30, 2013, <http://researcher.watson.ibm.com/researcher/view_group.php?id=4024>.

IBM, "IBM: Investing Its Expertise to Deliver Superior Disaster Response", Dec. 12, 2013, <http://www.freeenterprise.com/civic-leadership/ibm-investing-its-expertise-deliver-superior-disaster-response>.

IBM, "Smarter Cities solutions for emergency management", provided in post disclosure comments dated Mar. 4, 2014, <https://www.ibm.com/smarterplanet/us/en/public_safety/nextsteps/solution/M573313P64918R78.html>.

"Australia Disaster Management Program", The Australia Disaster Management Platform (ADMP)—2013, <http://admp.org.au/>.

"Building resilience into our cities", AECOM, Jan. 29, 2014, <http://www.aecom.com/News/What+We+Do/Environment/_carousel/Building+resilience+into+our+cities>.

"Emergency communication system", Wikipedia, the free encyclopedia, page last modified on Sep. 30, 2014 at 09:32, <http://en.wikipedia.org/wiki/Emergency_communication_system>.

"Oasis Loss Modeling Framework", Copyright 2014, <http://www.oasislmf.org/>.

University of Melbourne, IBM and NICTA to Collaborate on Disaster Management Platform to Enable Fast Evidence-based Decisions Using Real-time Information, Mar. 14, 2013 10:30, <http://www.nicta.com.au/media/previous_releases3/2013_media_releases/university_of_melbourne,_ibm_and_nicta_to_collaborate_on_disaster_management_platform_to_enable_fast_evidence-based_decisions_using_real-time_information>.

* cited by examiner

US 9,953,028 B2

COGNITIVE CONTEXTUALIZATION OF EMERGENCY MANAGEMENT SYSTEM COMMUNICATIONS

BACKGROUND OF THE INVENTION

The present invention relates generally to the field of emergency management systems, and more particularly to assessments of emergency communications.

Emergency (or disaster) management is known. Emergency management is the function of reducing vulnerability to and coping with emergencies. Examples of events covered by emergency management include acts of terrorism, industrial sabotage, fire, natural disasters, public disorder, industrial accidents, and communication failures. An emergency management system (or "EMS", also known as an emergency management information system) is a computer system for emergency management that provides real-time information to responders.

SUMMARY

According to an aspect of the present invention, there is a method that performs the following steps (not necessarily in the following order): (i) receiving an input communication from a first user, wherein the input communication includes input information relating to an event; (ii) receiving a first user contextual information, wherein the first user contextual information pertains to an emotional state of the first user at the time the input communication was received; (iii) determining an output communication based, at least in part, on the received first user contextual information, wherein the output communication includes output information relating to the event; and (iv) sending the output communication to a first recipient.

According to an aspect of the present invention, there is a computer program product comprising a computer readable storage medium having programming instructions for: (i) receiving an input communication from a first user, wherein the input communication includes input information relating to an event; (ii) receiving a first user contextual information, wherein the first user contextual information pertains to an emotional state of the first user at the time the input communication was received; (iii) determining an output communication based, at least in part, on the received first user contextual information, wherein the output communication includes output information relating to the event; and (iv) sending the output communication to a first recipient.

According to an aspect of the present invention, there is a computer system comprising a processor(s) set and a computer readable storage medium. The processor set is structured, located, connected and/or programmed to run program instructions stored on the computer readable storage medium. The program instructions include: (i) receiving an input communication from a first user, wherein the input communication includes input information relating to an event; (ii) receiving a first user contextual information, wherein the first user contextual information pertains to an emotional state of the first user at the time the input communication was received; (iii) determining an output communication based, at least in part, on the received first user contextual information, wherein the output communication includes output information relating to the event; and (iv) sending the output communication to a first recipient.

DETAILED DESCRIPTION

Figure 1:
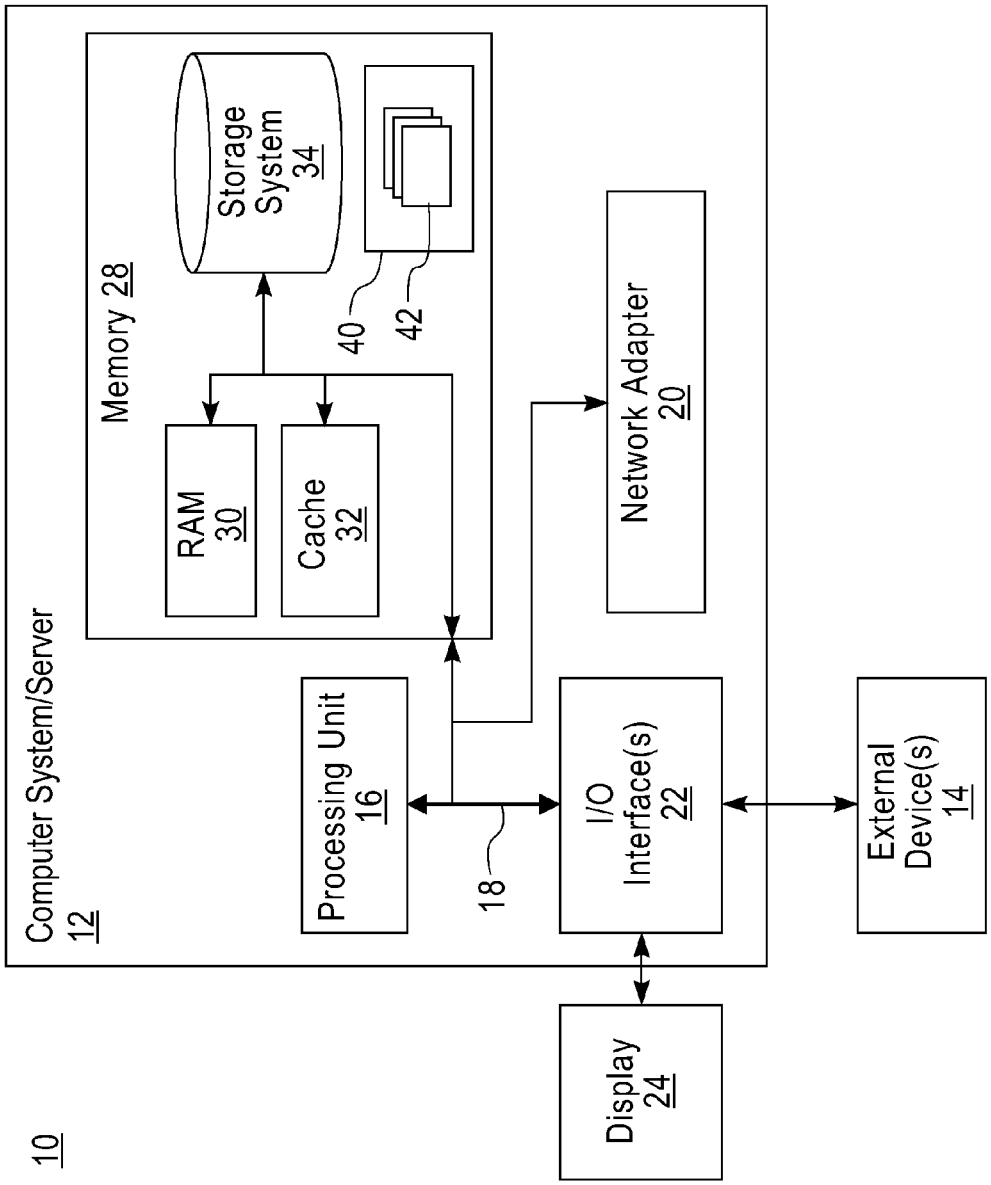
FIG. 1 depicts a cloud computing node according to an embodiment of the present invention.

Communication during an emergency event can be vitally important in reducing its potential impact. Embodiments of the present invention use machine logic based algorithms to contextualize communications during an emergency event to maximize the understandability of the communications as well as to supplement the communications with any information that may be helpful in managing the particular emergency. This Detailed Description section is divided into the following sub-sections: (i) The Hardware and Software Environment; (ii) Example Embodiment; and (iii) Further Comments and/or Embodiments.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
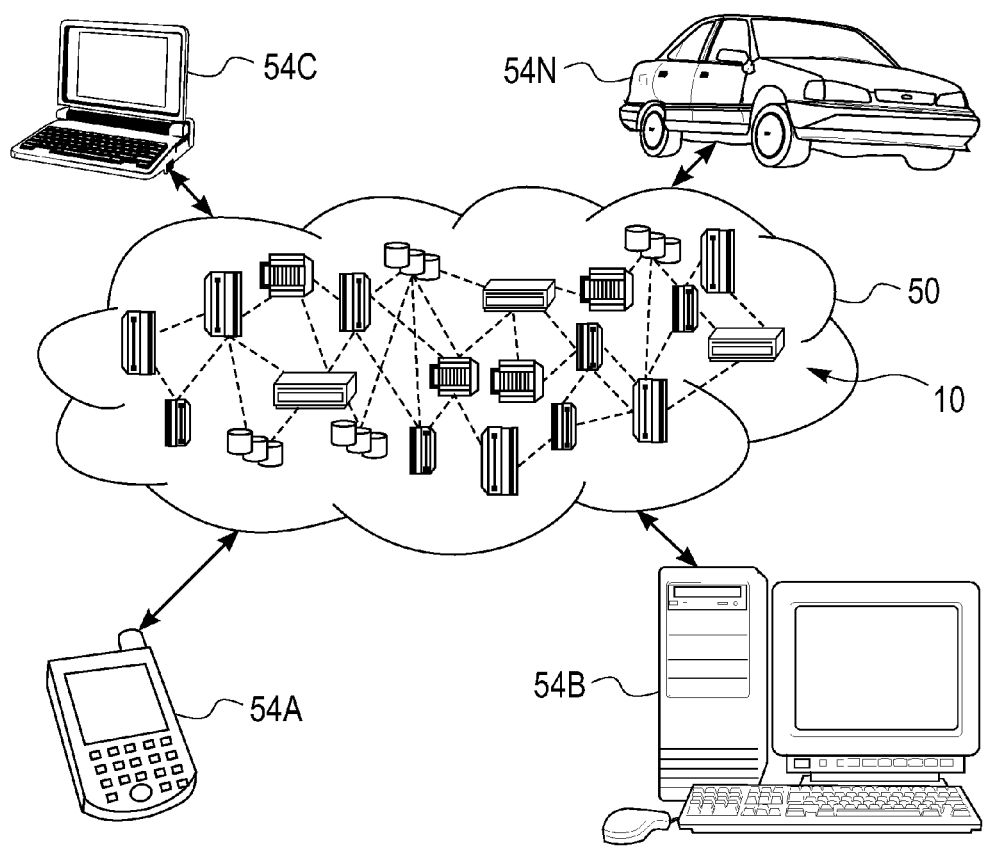
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
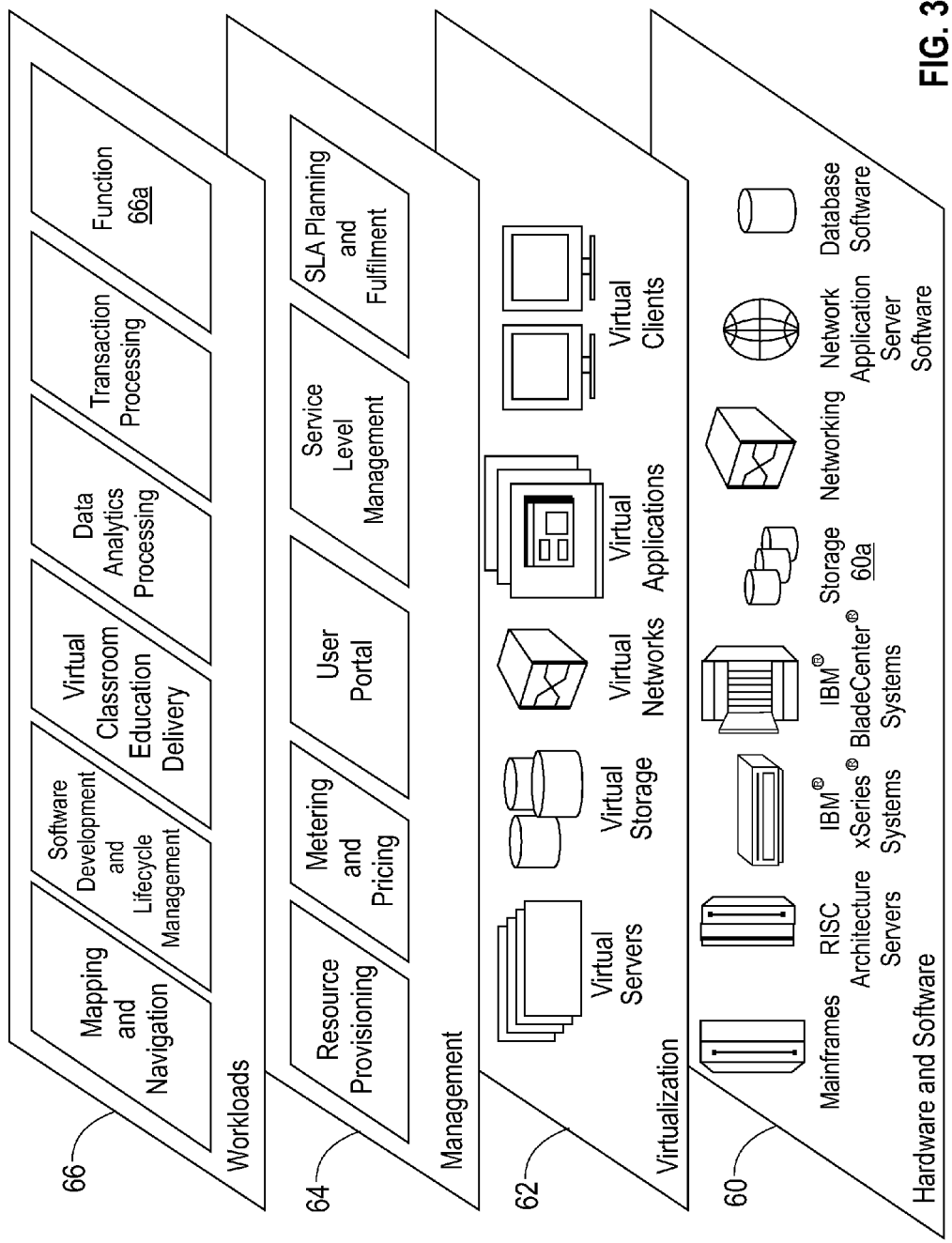
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 4:
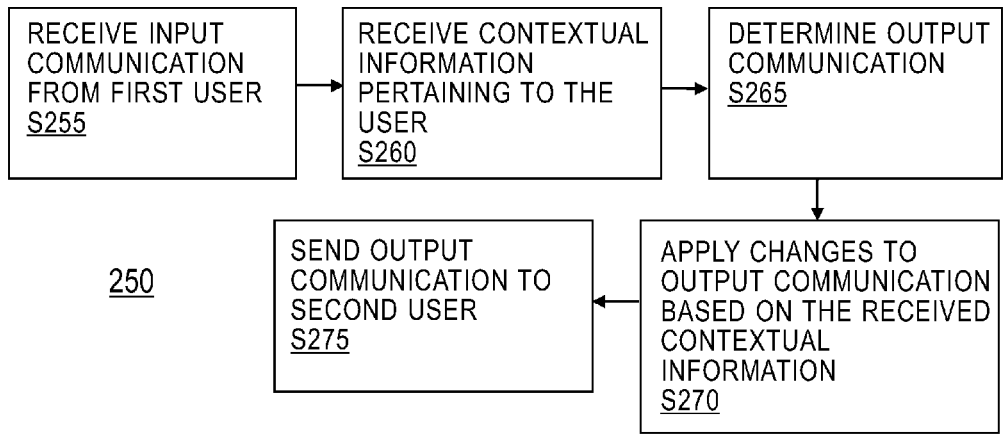
FIG. 4 is a flow chart showing a method performed, at least in part, by a system according to the present invention.
Figure 5:
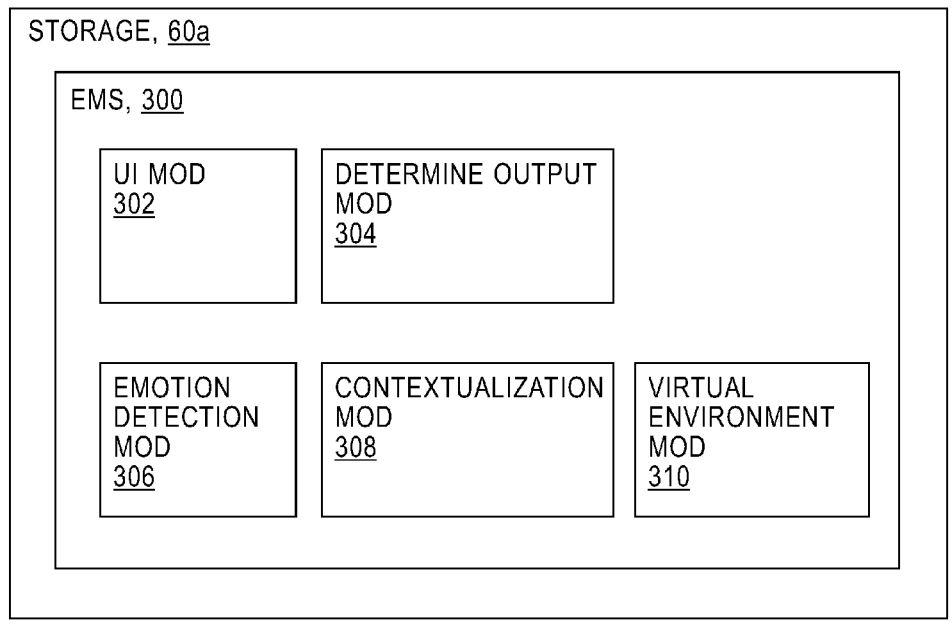
FIG. 5 is a block diagram showing a machine logic (for example, software) portion of a system according to the present invention.

FIG. 4 shows flow chart 250 depicting a method according to the present invention. FIG. 5 shows EMS 300 for performing at least some of the method steps of flow chart 250. This method and associated software will now be discussed, over the course of the following paragraphs, with extensive reference to FIG. 4 (for the method step blocks)

and FIG. 5 (for the software blocks). One physical location where EMS 300 of FIG. 4 may be stored is in storage block 60a (see FIG. 3).

Embodiments of the present invention refer generally to events and their associated management systems. For example purposes, the following paragraphs refer to emergency events and emergency management systems (EMS), however the present invention is not limited as such. During an emergency event, communication between individuals involved in, and responding to, the event can be critical in mitigating and/or reducing any potential negative effects resulting from the event. An EMS (such as EMS 300) is a computer system for managing an emergency event that provides real-time information to those involved in the event. In one example embodiment (to be referred to throughout this sub-section), the emergency event is a flood, and EMS 300 includes an emergency communication system where users involved in the event can communicate with each other. For additional discussion of emergency events and emergency management systems, and for additional examples, see the Further Comments and/or Embodiments sub-section of this Detailed Description. Furthermore, some additional example of emergency events may include, but are not limited to: acts of war; acts of terrorism and/or cyber-terrorism (including security breaches of computer-based or communication-based systems); industrial sabotage; fire; natural disasters and weather-related events; public disorder; industrial accidents; communication failures; the spread of diseases and/or pathogens; the contamination of water and/or air by germs, chemicals, and/or other contaminants; extraterrestrial events (including comets); radioactive contamination; and/or chemical spills.

Processing begins at step S255 (see FIG. 4), where user interface (UI) module ("mod") 302 (see FIG. 5) receives an input communication from a first user, where the input communication includes input information relating to the emergency event. The first user may be anyone involved in responding to an emergency event, or, in some cases, may be someone who is being affected by the event (such as a victim or other injured party). In some embodiments, for example, the first user may be a police officer, a firefighter, an ambulance operator, an emergency medical technician, a doctor, a nurse, and/or a volunteer. Furthermore, the input communication may be any type of communication being communicated by the first user. For example, the input communication may be a spoken communication, a written communication, and/or a communication retrieved from an analysis of the user's actions (such as via sign language). In the present example embodiment, the first user is a person who is caught in the previously-mentioned flood. In this example, the input communication is a voice message from the first user to "please rescue me."

Processing proceeds to step S260, where UI mod 302 receives contextual information pertaining to the user. The contextual information can be any information relating to the user that may be helpful in aiding and/or translating the user's communications. For example, in some embodiments, the contextual information includes the user's location, the user's role (such as firefighter or police officer), and/or the user's status in relation to the emergency. Further, in some embodiments, the contextual information includes information pertaining to the first user's emotional state (such as the user's mood and/or attitude) at the time the input communication (and input information) was received. This emotional information may be received directly, or determined by processing the input communication through emotion detection mod 306 (see FIG. 5). In the present example embodiment, mod 302 receives two pieces of contextual information pertaining to the user: (i) the user is in a location that is surrounded by water due to the flood; and (ii) the user is agitated (determined using emotion detection mod 306).

Additional examples of contextual information pertaining to the user include, but are not limited to: (i) whether, and to what extent, the user has been affected by the emergency event; (ii) the user's access to mitigation equipment (for example, special vehicles and hazmat suits); and/or (iii) a cognitive assessment of the user (such as the level of user distraction and the ability to operate under a condition of stress, including the stress of noise, heat, and/or cold). Furthermore, examples of contextual information pertaining to an emergency event include, but are not limited to: (i) the location of the emergency event; (ii) weather conditions and/or forecast (for example, if an area is flooded or if it is raining); (iii) events occurring during the emergency event (for example, reported incidents and their forecasted evolution); (iv) the time of day; (v) the types of persons affected by the emergency event (including information about their age, mobility, whether they require medical assistance, and/or any other special conditions); and/or (vi) affected infrastructure and the predicted impact of the infrastructure (such as a bridge outage limiting access to a community).

The contextual information may be obtained using a wide variety of known (or yet to be known) methods. In some embodiments, the contextual information is obtained, at least in part, from a database with known information about the user and/or the user's relation to the particular emergency event. Additionally, as mentioned above, the contextual information may be retrieved from an analysis of the user's voice using emotion detection mod 306. For additional examples of ways that the contextual information can be retrieved, see the Further Comments and/or Embodiments sub-section of this Detailed Description.

Processing proceeds to step S265, where determine output mod 304 (see FIG. 5) determines an output communication based on the input communication. The output communication includes output information relating to the emergency event. In many embodiments, including the present example embodiment, the first user is delivering the input information for the simple purpose of communicating it to another user. In such cases, the output information is identical to the input information. However, that may not always be the case. In some embodiments, the first user may desire for EMS 300 to include some additional information in the output communication before outputting it. For example, the first user may ask EMS 300 to "provide a second user with directions to the emergency event." In that example, the output communication would include directions to the emergency event (as opposed to simply a statement asking for directions). Additionally, in other embodiments, EMS 300 includes a question answering (QA) system. In these embodiments, the first communication may include a question directed to EMS 300. In these cases, the output communication may include an answer to the question. For further discussion of QA systems, see the Further Comments and/or Embodiments sub-section of this Detailed Description.

Processing proceeds to step S270, where contextualization mod 308 (see FIG. 5) applies changes to the output communication based on the received contextual information. In this step, EMS 300 uses machine logic to determine whether and to what extent the output communication should be contextualized. In some embodiments, for example, EMS 300 may determine that no changes are needed. In other embodiments, EMS 300 may determine, based on the contextualized information that the output communication shouldn't be sent at all. In the present example embodiment, EMS 300 determines that the output communication should be modified to include the following: (i) the first user's agitated state; and (ii) the fact that the first user's rescuer must be able to reach an area surrounded by water. As such, contextualization mod 308 modifies the original output information ("please rescue me") to read "Help! Please rescue me. I'm surrounded by water, so bring a boat or a helicopter." For further examples of contextualized output information and communications, see the Further Comments and/or Embodiments sub-section of this Detailed Description.

Figure 6:
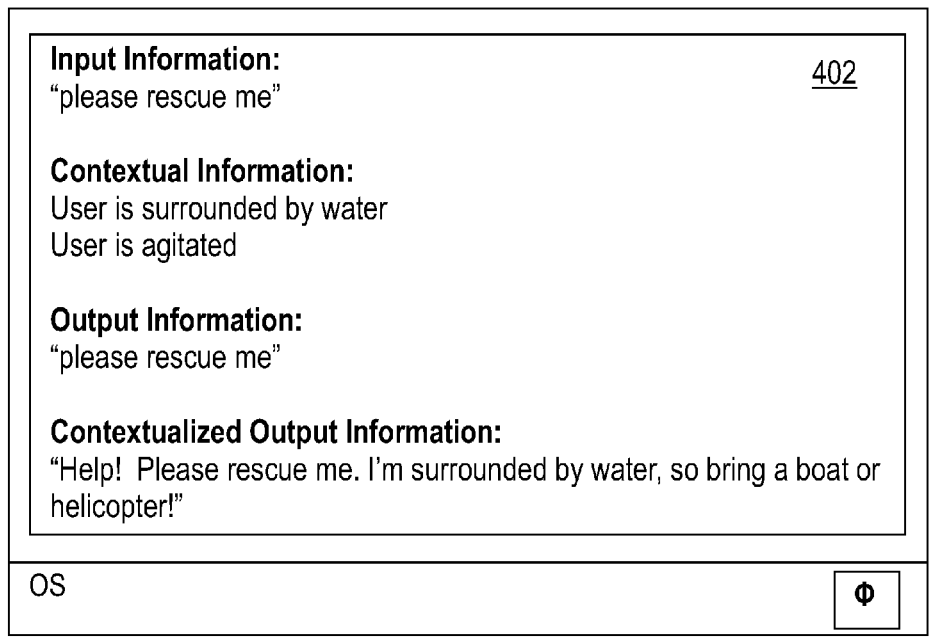
FIG. 6 is a screenshot view generated by a system according to the present invention.

Processing proceeds to step S275, where UI mod 302 (see FIG. 5) sends the output communication to a second user. In the present example embodiment, the second user is an emergency responder who is equipped to help rescue the first user. Screenshot 400 (see FIG. 6) shows one example of how the output information may be communicated to the second user. In this example, EMS 300 displays output text 402, which not only displays the output communication, but also other information pertaining to EMS 300, including: (i) the input information; (ii) the contextual information; and (iii) the original (unmodified) output information. In doing this, EMS 300 is able to provide the second user with additional context to assist the second user in responding to the first user. However, this is not meant to be limiting, and the second user may be one of a wide variety of individuals. In fact, in some examples (such as the question answering example mentioned above), the second user may, in fact, be the same person as the first user.

As with the input communication, the output communication may be one of many different types of communication. Some typical examples include textual content, audio content, and/or video content. However, in other embodiments, the output communication may be more complex. For example, in some embodiments (also discussed below in the Further Comments and/or Embodiments sub-section of this Detailed Description), the output information may include information contained in a virtual environment generated by virtual environment mod 310 (see FIG. 5), where information can be communicated in a three-dimensional form. The virtual environment may include, for example, an avatar and/or background scenery. In these embodiments, the output communication may include changing characteristics of the avatar (such as the avatar's appearance, motions, and/or vocal characteristics) and/or changing the scenery (such as transitioning from a hospital environment to an airport environment). Furthermore, in some embodiments, the sending of the output communication may include automatically displaying the virtual environment for the user to view the output information.

Although the present example embodiment includes a simple example where a first user's communication is altered based on the first user's contextual information, other embodiments of the present invention may use the UI mod 302, the emotion detection mod 306, and the contextualization mod 308 in additional, more complex, ways. For example, in some embodiments (including some discussed below in the Further Comments and/or Embodiments sub-section of this Detailed Description), the UI mod 302 may receive contextual information pertaining to the second user in order to further contextualize the output communication. Furthermore, in other embodiments, the determination of whether to apply changes to the output communication may be based on an emotionality threshold, where the output communication is only changed if the first user's emotional state and/or the second user's emotional state are above the predetermined emotionality threshold. However, these examples are not meant to be limiting, and EMS 300 may be adapted to contextualize communications in a wide variety of ways and/or combinations.

III. Further Embodiments of the Present Invention

Some embodiments of the present invention recognize the following facts, potential problems and/or potential areas for improvement with respect to the current state of the art: (i) the current state of the art does not include question answering (QA) systems capable of interoperability between multiple agencies during an emergency/disaster; (ii) existing systems do not employ goal-oriented inferencing for selecting actions based on QA insights; and/or (iii) existing systems do not obtain emotion assessments and context assessments to obtain additional QA insights.

Some embodiments of the present invention may include one, or more, of the following features, characteristics and/or advantages: (i) augmenting human-to-human communication networks with context aware, cognitive indicators and information in order to deal with problems that often occur during disasters; (ii) dynamically tailoring and altering communication to effect the maximum level of understanding; (iii) enabling both human-to-human interaction and human-to-machine interaction; (iv) determining the urgency of an answer based on the emotional context of a human questioner; and/or (v) initiating communication in the most suitable manner, based on the cognitive state of the recipient and sender.

Embodiments of the present invention refer to QA systems (sometime also referred to as "DeepQA" systems). Generally speaking, QA systems answer natural language questions by querying data repositories and applying elements of natural language processing (NLP), information retrieval, and machine learning to arrive at a conclusion. QA systems of the present invention enhance typical QA responses so that the presented answers to questions (also referred to as "information", where the questions are sometimes referred to as "input information" and the answers are sometimes referred to as "output information") have higher value than that which would have been developed by an information repository alone. For example, in the area of emergency management, typical information utilized by a QA system could include emergency management policies and the organizational structure of different stakeholders (such as police officers, firefighters, disaster management units, and volunteer organizations). However, a QA system of the present invention also relies on contextual information relating to the specific emergency, including, for example the location of stakeholders and responders, weather conditions, incidents report, and other specific information about the emergency.

Embodiments of the present invention provide a system and a method for contextualizing answers returned by a QA system by supplementing typical QA answer information with context and cognitive input. More particularly, some embodiments employ: (i) an NLP QA system; (ii) a means for obtaining situational and emotional awareness for questions asked of the QA system; and (iii) a means for contextualizing and personalizing answers to the questions for the user asking them. The contextualization and personalization of answers occurs, at least in part, by analyzing content, context, and relationships in a disaster organizational network (for example, a network of disaster agency personnel).

Additionally, some embodiments use machine learning to improve the QA system over time. For example, in these embodiments: (i) machine learning may be used to determine which emergency response actions should be performed by which emergency response agencies; and/or (ii) machine learning may be used to prioritize the most relevant element(s) of a question and/or answer.

It should be noted that during an emergency event, multiple users from multiple agencies (for example, firefighters, ambulance operators, and police officers) may benefit from the use of the QA system. As such, embodiments of the present invention include different cognitive models and priorities for different types of users. For example, if firefighters tasked with evacuation ask for directions to an emergency, the QA system may provide the firefighters with directions to people caught in brush fires (as opposed to direct victims). However, if a maintenance crew asks for directions, the QA system might provide the crew with directions to assets damaged by the fire. QA systems of the present invention may learn from these varying users in real time, providing for a shared contextual awareness to increase understanding and improve decisions. In these embodiments, not only does the QA system provide contextually relevant answers to questions for these different users, but it also uses its knowledge of the different user types to learn usage scenarios for future disasters.

Contextual information about the user may be determined in a number of ways. Some examples include: (i) the user explicitly providing his or her user type (or role) when submitting a question (either voluntarily or when prompted by the QA system); (ii) retrieving contextual information from a user profile; (iii) retrieving contextual information from a user's mobile device; (iv) inferring contextual information based on other known factors (such as what is happening around the user, or who the user is with); (v) using historical contextual information to predict current contextual information; and/or (vi) considering the context of a user's social network. Additionally, in some cases, the confidence level of a particular piece of contextual information can be increased by an automated assessment of words used in a QA dialog. For example, a paramedic may tend to use different words than an untrained person.

To contextualize answers to questions, QA systems of the present invention may rely on a wide variety of contextual data. Examples of contextual data include: (i) the role (or type) of the person asking the question (some examples: a deputy police offer, a field volunteer, an incident controller, a response team leader); (ii) the location of the emergency (hyper-local, local, and/or regional); (iii) weather conditions and/or forecast (for example, if an area is flooded or if it is raining); (iv) events occurring during the emergency (for example, reported incidents and their forecasted evolution); (v) the time of day; (vi) the types of persons affected by the emergency (including information about their age, mobility, whether they require medical assistance, and/or any other special conditions); and/or (vii) affected infrastructure and the predicted impact of the infrastructure (such as a bridge outage limiting access to a community). Additionally, contextual data may be combined with, or obtained by, instrument data. In one example, the following instruments work in tandem to collect contextual data relating to an earthquake emergency: (i) a tide gauge; (ii) underwater pressure sensors; (iii) Global Positioning System ("GPS") buoys; (iv) GPS satellites; (v) GPS stations; (vi) communications satellites; (vii) seismometers; and (viii) an emergency warning center.

In one example according to the present invention, a firefighter asks the QA system: "can you show me the route to the affected area?" In this example, the QA system uses the following contextualized data in providing a route to the firefighter: (i) who (firefighters); (ii) where (the affected area); (iii) what (the route); (iv) conditions (fire level=3); and (v) equipment (fire truck/appliance). Utilizing the contextualized data, the QA system displays the shortest route possible (i.e. the output information), given the capability of the fire truck to get through the fire exclusion zone.

Continuing with the same example, a state volunteer then asks the QA system: "can you show me the route to the affected area? We need to extract people from vehicles." In this situation, the QA system displays a detour route (i.e. the output information, a different route than the police officer's route), as the QA system knows that the volunteer's vehicle is not able to pass through the fire exclusion zone.

Continuing still with the same example, a police officer sends a question to the QA system: "I need to evacuate 10 immobile people from the affected area. Where is the closest evacuation center?" Utilizing contextualized data (such as the predicted fire path), the QA system routes the police officer to the second closest evacuation center, as the nearest evacuation center is not equipped to care for 10 additional immobile people.

In addition to the contextualization factors mentioned above, some embodiments of the present invention may also include emotion detection to further contextualize answers to questions. For example, a user's emotion may help: (i) estimate the severity of an emergency event; (ii) determine whether the user is able to fully appreciate the answers to his or her questions; and/or (iii) assess the functioning of the user under pressure. Furthermore, emotion may have different meanings and trigger different answers based on the user's role. For example, extreme emotion of a paramedic may have a different significance than extreme emotion of a non-trained person.

A user's emotion may be determined by many means, including, for example, via biometrics and/or voice stress analysis. In some embodiments, a prosody analyzer can be used to enhance the emotional interpretation of natural language utterances. In these embodiments, the analyzer is distributed over a client/server architecture, so that the scope of emotion recognition processing tasks can be allocated on a dynamic basis based on processing resources, channel conditions, and/or client loads, for example. Partially processed prosodic data can be sent from a client device and streamed to a server for a real-time response. Furthermore, the prosody analyzer can be trained with real-world expected responses to improve emotion modeling and the real-time identification of potential emotional features such as emphasis, intent, attitude and semantic meaning in the user's utterances.

Figure 7:
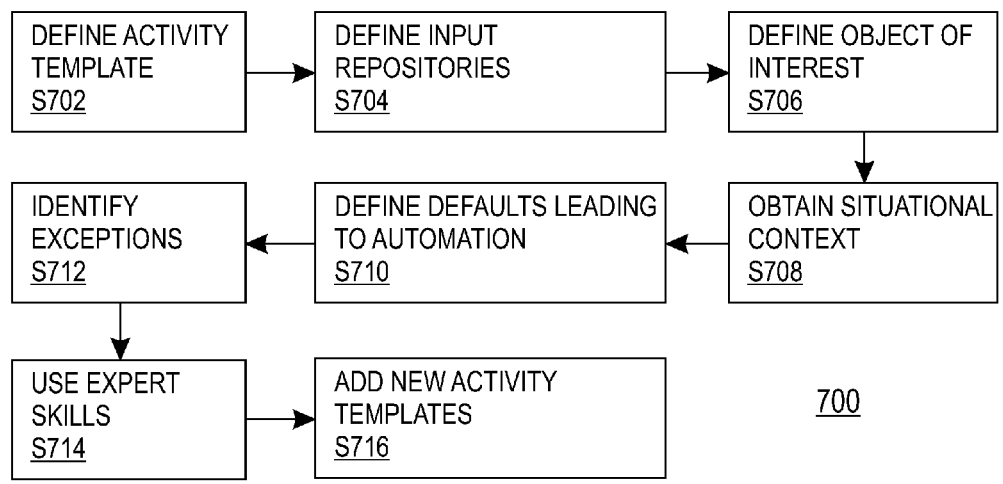
FIG. 7 is flow chart showing a method performed, at least in part, by a system according to the present invention.

Flow chart 700 (see FIG. 7) shows a method according to the present invention for creating a QA activity template for an emergency situation. By "templating" an emergency response situation and saving the template for future use, the QA system will be able to respond more quickly and efficiently the next time a similar emergency occurs. Processing begins at step S702, where the QA system (or, more generally, the EMS) defines the activity template to be created. In this example, a user is requesting a route to victims of an emergency, so the EMS determines that a template for obtaining routes should be created. The EMS determines that, to obtain the proper route, it needs to retrieve the user's (i.e. the requester's) role, the user's location, and the user's capabilities.

Processing proceeds to step S704, where the EMS defines input repositories. In the present example, input repositories for emotion assessment and context assessment are created.

Processing proceeds to step S706, where the EMS defines an object of interest. In this example, the object of interest is the destination of the route (specifically, a burning building).

Processing proceeds to step S708, where the EMS obtains situational context of the events surrounding the emergency. In the present example, the EMS obtains: (i) crew locations and capabilities (such as the type of fire truck/appliance being used); (ii) ongoing activities in the area (such as road closures), with context; and (iii) key insights about the area (such as what the infrastructure looked like before damage, what the estimated impact is, or what the predicted future issues are).

Processing proceeds to step S710, where the EMS defines defaults leading to automation. In this step, the EMS uses the previously retrieved contextualized information to update default routes. In the present example, the EMS: (i) updates a fire truck route based on where fire victims need to be taken; (ii) updates a police car route based on the location of a fire crew; and (iii) updates an ambulance route to meet the fire truck to transfer victims.

Processing proceeds to step S712, where the EMS identifies exceptions to the previously mentioned defaults. Processing then proceeds to step S714, where the EMS uses expert skills to further contextualize the defaults. Finally, processing proceeds to step S716, where the new activity template is added to an EMS template database.

Figure 8:
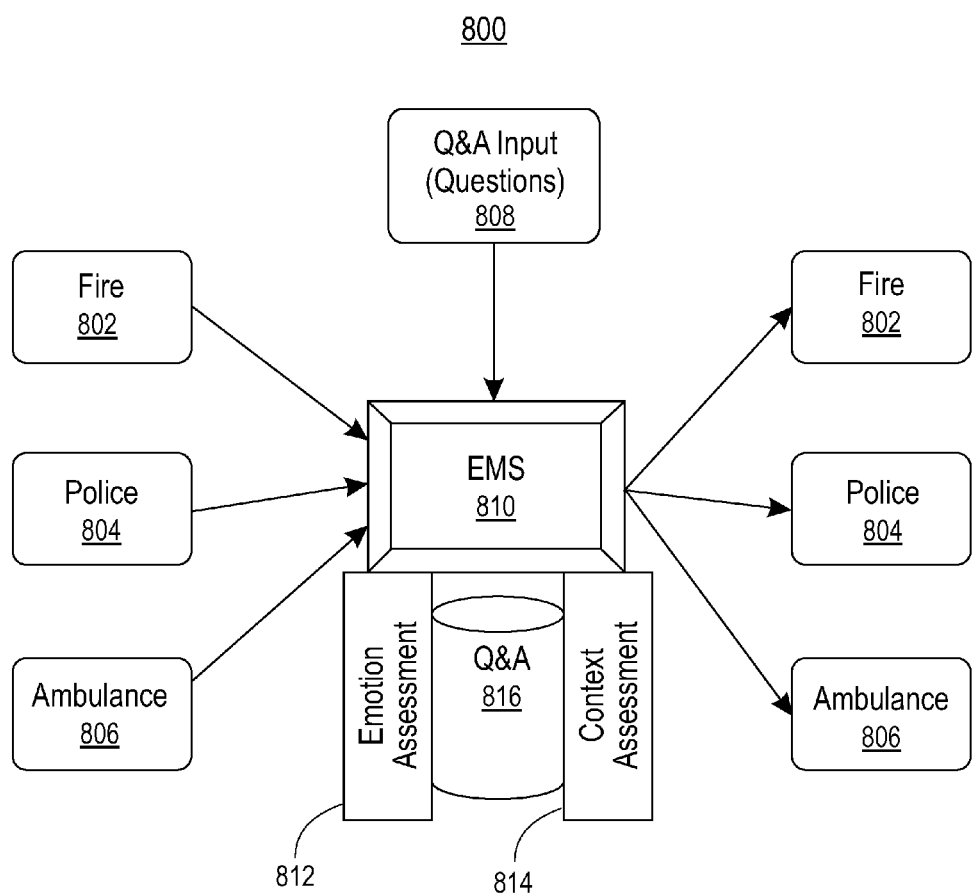
FIG. 8 is a diagram showing information that is helpful in understanding a system according to the present invention.

Diagram 800 (see FIG. 8) shows an example system diagram of an enhanced emergency management system 810 according to the present invention. In this embodiment: (i) emergency crews (such as fire 802, police 804, and ambulance 806) continuously broadcast their context and activities; (ii) emergency crews consult EMS 810 for decision support on their next actions (by asking questions 808); (iii) EMS 810 coordinates the crews (such as fire 802, police 804, and ambulance 806) and their activities based on the cognitive input and past requests (utilizing Q&A module 816, emotion assessment module 812, and context assessment module 814); and (iv) EMS 810 learns to anticipate future requests in order to improve coordination of crews (such as fire 802, police 804, and ambulance 806). Referring to the example discussed above (in relation to method 700), the EMS may monitor the following communications: (i) a message from a fire crew stating that another fire crew is providing additional support; (ii) a message from a police officer reporting an increase of accidents due to smoke coming from a fire; and (iii) a message from an ambulance saying that the ambulance crew is understaffed. As a result of the monitored communications, and as a result of questions asked by the various emergency crews, the EMS: (i) updates the fire crew's route based on where fire victims need to be taken; (ii) instructs the police car to focus on the traffic; and (iii) updates the ambulance route to meet the fire truck to transfer victims.

Some embodiments of the present invention convey emergency information via a virtual environment to better communicate the information to users. In these embodiments, context information and emotion-related information may be used to change avatar characteristics and/or scenery. Additionally, the virtual environment may be triggered automatically based on the information to be communicated. For example, if the answer to a question includes the location of a burning building, the QA system may switch to a virtual environment to display a map or a virtual rendering of the building. Or, in another example, if the answer to a question includes information regarding an injured person, the QA system may switch to a virtual environment to display a virtual rendering of the person's injury. In yet another example, the QA system may switch to a virtual environment to display hazard gear that the user may be recommended/required to wear when responding to the emergency.

Some embodiments of the present invention are adapted to operate with emergency communication systems (ECS), where emergency related information is communicated from senders to recipients. These embodiments recognize the following facts, potential problems and/or potential areas for improvement with respect to the current state of the art: (i) access overload, where users of communications networks overwhelm those networks, rendering them useless during an emergency; (ii) infrastructure dependency and interoperability; (iii) the likelihood of false alarms during emergency situations; and/or (iv) the need to tailor warnings, alerts, and other information to specific audiences during an emergency.

Regarding access overload, some embodiments of the present invention are adapted to evaluate a user's communications in real time and prioritize them automatically. For example, cognitive and emotional models of users can determine the cognitive state of the sender, the cognitive state of the receiver, and the difference in cognitive states between the sender and the receiver. This can allow messages (i.e. "output communications") to be queued according to the expected effect on the overall cognitive state of senders and recipients.

Similarly, the cognitive and emotional state of different users can be used to address the issue of infrastructure dependency and interoperability. Based on an assessment of the cognitive and emotional state of users, the EMS can determine whether a message needs to be transmitted at all or whether the content of the message needs to be modified before receipt. For example, communication between police and between firefighters in a disaster area may be isolated by a lack of interoperability between their respective systems. However, the complete merging of these systems may be confusing and therefore not desirable. Instead, the cognitive dispositions of each force are used to tailor and augment communication within each network, providing situational information that is useful, but not distracting from the task-specific content of each force's communications.

During emergency situations, the senders and the recipients of messages do not always treat the message with the same amount of importance. This can happen, for example, if the recipient thinks that a message is a "false alarm." Embodiments of the present invention measure the rate of habituation and responsiveness of recipients to therefore tailor and alter a message such that it will maximize the chance that the recipient will properly understand the severity and/or importance of the message. For example, if the sender and the recipient of a message both have a high certainty that a message is important, no change is needed. But if the sender is measurably agitated and the receiver doesn't appear to be taking the sender seriously, the system can alert and increase the urgency of the warning so that the recipient is more likely to consider it to be important.

Some embodiments of the present invention tailor warnings to specific audiences based on cognitive and emotional matchmaking. In these embodiments, senders and recipients are profiled to determine the best way to effectively transmit information between them. In some situations, communication masks can be created to automatically direct certain output communications to appropriate recipients independently of the message's content. For example, a user of the system may make periodic broadcasts, each reflecting a different cognitive/emotional state and therefore attempting to communicate different information for different reasons to different recipients. By probing recipients for the effected change in cognitive state achieved, the system can learn which cognitive/emotional states of the sender predict the biggest change in cognitive/emotional states of the receiver. Then the system can decide to communicate information based on the expected cognitive/emotional change of the user.

Some embodiments of the present invention may include the use of head mounted displays (HMD). HMD have the ability to provide real-time and tailored information to a user, including situationally relevant overlays of the environment, in a cognitive context specific manner. In this way, a user (recipient) of a shared communication network, such as a two way radio system, may have access to bursts of HMD information relayed from the sender of a message, thereby conveying to the recipient not only the content of the message but also the situational awareness artifacts currently represented on the recipient's HMD.

What is claimed is:

1. A method comprising:
    receiving, by an emergency management system adapted to facilitate human-to-human communications between individuals involved in emergencies, an input communication written, spoken, or communicated via gestures by a first user, wherein the input communication includes natural language-based input information relating to a pre-identified emergency event;
    receiving, by the emergency management system, a first user contextual information, wherein the first user contextual information includes information regarding the first user's status in relation to the emergency event, and wherein the first user contextual information further includes partially processed prosodic data pertaining to an emotional state of the first user at the time the input communication was received;
    utilizing, by the emergency management system, a prosody analyzer to provide an enhanced emotional interpretation of the input communication, based, at least in part, on the partially processed prosodic data of the received first user contextual information, wherein the prosody analyzer allocates emotion recognition processing tasks over a client/server architecture on a dynamic basis based, at least in part, on channel conditions and client loads;
    determining, by the emergency management system, an output communication based, at least in part, on the input communication, wherein the output communication includes natural language-based output information relating to the emergency event;
    modifying, by the emergency management system, the output communication based, at least in part, on the first user contextual information and the enhanced emotional interpretation, wherein modifying the output communication includes modifying natural language content of the output information;
    sending, by the emergency management system, the output communication to a second user;
    determining, by the emergency management system, a cognitive state of the first user and a cognitive state of the second user; and
    prioritizing, by the emergency management system, the sending of the output communication over other output communications based, at least in part, on the cognitive state of the first user and the cognitive state of the second user.

2. The method of claim 1, further comprising:
    receiving a second user contextual information pertaining to an emotional state of the second user, wherein the modifying of the output communication is further based, at least in part, on the second user contextual information.

3. The method of claim 1, wherein:
    the output information includes information contained in a three-dimensional virtual environment.

4. The method of claim 3, wherein:
    the sending of the output communication includes automatically displaying the virtual environment for viewing of the output information.

5. The method of claim 3, wherein:
    the virtual environment includes an avatar; and
    the output communication includes changing a characteristic of the avatar included in the virtual environment.

6. The method of claim 3, wherein:
    the virtual environment includes a scenery; and
    the output communication includes changing the scenery included in the virtual environment.

7. The method of claim 1, wherein:
    the first user is one of the following: a police officer, a firefighter, an ambulance operator, an emergency medical technician, a doctor, or a nurse.

8. A computer program product comprising a computer readable storage medium having stored thereon:
    program instructions programmed to receive, by an emergency management system adapted to facilitate human-to-human communications between individuals involved in emergencies, an input communication written, spoken, or communicated via gestures by a first user, wherein the input communication includes natural language-based input information relating to a pre-identified emergency event;
    program instructions programmed to receive, by the emergency management system, a first user contextual information, wherein the first user contextual information includes information regarding the first user's status in relation to the emergency event, and wherein the first user contextual information further includes partially processed prosodic data pertaining to an emotional state of the first user at the time the input communication was received;
    program instructions programmed to utilize, by the emergency management system, a prosody analyzer to provide an enhanced emotional interpretation of the input communication, based, at least in part, on the partially processed prosodic data of the received first user contextual information, wherein the prosody analyzer allocates emotion recognition processing tasks over a client/server architecture on a dynamic basis based, at least in part, on channel conditions and client loads;
    program instructions programmed to determine, by the emergency management system, an output communication based, at least in part, on the input communication, wherein the output communication includes natural language-based output information relating to the emergency event;
    program instructions programmed to modify, by the emergency management system, the output communication based, at least in part, on the first user contextual information and the enhanced emotional interpretation, wherein modifying the output communication includes modifying natural language content of the output information;

program instructions programmed to send, by the emergency management system, the output communication to a second user;

program instructions programmed to determine, by the emergency management system, a cognitive state of the first user and a cognitive state of the second user; and program instructions programmed to prioritize, by the emergency management system, the sending of the output communication over other output communications based, at least in part, on the cognitive state of the first user and the cognitive state of the second user.

9. The computer program product of claim 8, further comprising:

program instructions programmed to receive a second user contextual information pertaining to an emotional state of the second user;

wherein:

the modifying of the output communication is further based, at least in part, on the second user contextual information.

10. The computer program product of claim 8, wherein:

the output information includes information contained in a three-dimensional virtual environment; and the sending of the output communication includes automatically displaying the virtual environment for viewing of the output information.

11. A computer system comprising:

a processor(s) set; and a computer readable storage medium;

wherein:

the processor set is structured, located, connected and/or programmed to run program instructions stored on the computer readable storage medium; and the program instructions include:

program instructions programmed to receive, by an emergency management system adapted to facilitate human-to-human communications between individuals involved in emergencies, an input communication written, spoken, or communicated via gestures by a first user, wherein the input communication includes natural language-based input information relating to a pre-identified emergency event;

program instructions programmed to receive, by the emergency management system, a first user contextual information, wherein the first user contextual information includes information regarding the first user's status in relation to the emergency event, and wherein the first user contextual information further includes partially processed prosodic data pertaining to an emotional state of the first user at the time the input communication was received;

program instructions programmed to utilize, by the emergency management system, a prosody analyzer to provide an enhanced emotional interpretation of the input communication, based, at least in part, on the partially processed prosodic data of the received first user contextual information, wherein the prosody analyzer allocates emotion recognition processing tasks over a client/server architecture on a dynamic basis based, at least in part, on channel conditions and client loads;

program instructions programmed to determine, by the emergency management system, an output communication based, at least in part, on the input communication, wherein the output communication includes natural language-based output information relating to the emergency event;

program instructions programmed to modify, by the emergency management system, the output communication based, at least in part, on the first user contextual information and the enhanced emotional interpretation, wherein modifying the output communication includes modifying natural language content of the output information;

program instructions programmed to send, by the emergency management system, the output communication to a second user;

program instructions programmed to determine, by the emergency management system, a cognitive state of the first user and a cognitive state of the second user; and program instructions programmed to prioritize, by the emergency management system, the sending of the output communication over other output communications based, at least in part, on the cognitive state of the first user and the cognitive state of the second user.

12. The computer system of claim 11, further comprising:

program instructions programmed to receive a second user contextual information pertaining to an emotional state of the second user;

wherein:

the modifying of the output communication is further based, at least in part, on the second user contextual information.

13. The computer system of claim 11, wherein:

the output information includes information contained in a three-dimensional virtual environment; and the sending of the output communication includes automatically displaying the virtual environment for viewing of the output information.

* * * * *